(12) United States Patent  
Wang

(10) Patent No.: US 11,343,333 B2  
(45) Date of Patent: May 24, 2022

(54) SERVICE DATA TRANSMISSION METHOD AND APPARATUS, COMPUTER DEVICE, AND COMPUTER-READABLE STORAGE MEDIUM

(71) Applicant: TENCENT TECHNOLOGY (SHENZHEN) COMPANY LIMITED, Guangdong (CN)

(72) Inventor: Tao Wang, Guangdong (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 17/165,021

(22) Filed: Feb. 2, 2021

(65) Prior Publication Data

US 2021/0160333 A1 May 27, 2021

Related U.S. Application Data

(63) Continuation of application No. PCT/CN2019/110979, filed on Oct. 14, 2019.

(30) Foreign Application Priority Data

Nov. 16, 2018 (CN) .......................... 201811368580.4

(51) Int. Cl.
  *H04L 29/08* (2006.01)
  *H04L 29/06* (2006.01)
  (Continued)

(52) U.S. Cl.
  CPC ............ *H04L 67/16* (2013.01); *H04L 67/306* (2013.01); *H04L 67/322* (2013.01); *H04L 67/42* (2013.01)

(58) Field of Classification Search
  CPC ....... H04W 84/12; H04W 24/02; H04W 4/08; H04W 72/042; H04W 24/08;
  (Continued)

(56) References Cited

U.S. PATENT DOCUMENTS 9,672,355 B2 6/2017 Titonis et al.
2003/0169720 A1* 9/2003 Sebastian ............... H04W 28/12
370/342

(Continued)

FOREIGN PATENT DOCUMENTS

CN 107659419 2/2018
CN 108156628 6/2018
(Continued)

OTHER PUBLICATIONS

International Search Report dated Jan. 6, 2020 in Application No. PCT/CN2019/110979. (5 pages).

(Continued)

*Primary Examiner* — Michael A Keller
*Assistant Examiner* — Thao D Duong
(74) *Attorney, Agent, or Firm* — Arentfox Schiff LLP

(57) ABSTRACT

This application discloses a service data transmission method and apparatus, and a device, which belongs to the field of communications. The method can include splitting a service stream into a plurality of service substreams, where the service stream include at least one of an asymmetric service stream and a hybrid service stream. The method can further include establishing network slices respectively corresponding to the plurality of service substreams, at least one network slice corresponding to the service substreams being transmitted by using a packet duplication mechanism, and transmitting service data of each service substream by using the network slices corresponding to the each service substream.

13 Claims, 11 Drawing Sheets

(51) Int. Cl.
  *H04L 67/51*  (2022.01)
  *H04L 67/306* (2022.01)
  *H04L 67/61*  (2022.01)
  *H04L 67/01*  (2022.01)

(58) Field of Classification Search
  CPC ....... H04W 48/16; H04W 4/021; H04W 4/80; H04W 52/42; H04W 72/0453; H04W 72/1284; H04L 1/0003; H04L 1/0009
  See application file for complete search history.

(56) References Cited

U.S. PATENT DOCUMENTS

| | | | | |
|---|---|---|---|---|
| 2009/0003384 | A1* | 1/2009 | Rozental | H04L 47/34 |
| | | | | 370/485 |
| 2011/0080877 | A1* | 4/2011 | Nentwig | H04L 1/0003 |
| | | | | 370/329 |
| 2011/0134816 | A1* | 6/2011 | Liu | H04L 5/0037 |
| | | | | 370/310 |
| 2011/0149900 | A1* | 6/2011 | Clima | H04B 10/032 |
| | | | | 370/329 |
| 2014/0369353 | A1* | 12/2014 | Desai | H04L 12/2856 |
| | | | | 370/390 |
| 2015/0154257 | A1 | 6/2015 | Xiong et al. | |
| 2015/0154258 | A1 | 6/2015 | Xiong et al. | |
| 2019/0037443 | A1* | 1/2019 | Lee | H04W 28/0231 |
| 2019/0075308 | A1* | 3/2019 | Wei | H04N 19/61 |
| 2019/0110208 | A1* | 4/2019 | Xue | H04B 17/309 |
| 2019/0140904 | A1* | 5/2019 | Huang | H04L 41/0816 |
| 2020/0125511 | A1* | 4/2020 | Thubert | H04W 74/08 |

FOREIGN PATENT DOCUMENTS

| | | |
|---|---|---|
| CN | 108235379 | 6/2018 |
| CN | 108631980 | 10/2018 |
| CN | 109039742 | 12/2018 |
| CN | 109257771 | 1/2019 |
| EP | 3471341 | 4/2019 |
| WO | 2015/084765 | 6/2015 |
| WO | 2015/084767 | 6/2015 |
| WO | WO 2016/192639 A1 | 12/2016 |
| WO | WO 2017/123127 A1 | 7/2017 |
| WO | 2018/019184 | 2/2018 |
| WO | WO 2018/093168 A1 | 5/2018 |

OTHER PUBLICATIONS

Written Opinion dated Jan. 6, 2020 in International Application No. PCT/CN2019/110979. (4 pages).
Chinese Office Action dated Jan. 2, 2020 in Application No. 201811368580.4, with concise English translation. (15 pages).
The Extended European Search Report dated Dec. 3, 2021, in corresponding European Patent Application No. 19883983.9, 10 pages.
Supplementary European Search Report dated Dec. 21, 2021, in corresponding European Patent Application No. 19883983.9.

* cited by examiner

SERVICE DATA TRANSMISSION METHOD AND APPARATUS, COMPUTER DEVICE, AND COMPUTER-READABLE STORAGE MEDIUM

RELATED APPLICATION

This application is a continuation of International Application No. PCT/CN2019/110979, filed on Oct. 14, 2019, which claims priority to Chinese Patent Application No. 201811368580.4, filed on Nov. 16, 2018 and entitled "SERVICE DATA TRANSMISSION METHOD, APPARATUS, AND DEVICE." The entire disclosures of the prior applications are hereby incorporated by reference in their entirety.

FIELD OF THE TECHNOLOGY

This application relates to the field of communications, including to a service data transmission method and apparatus, a computer device, and a non-transitory computer-readable storage medium.

BACKGROUND OF THE APPLICATION

The 5th generation mobile communication (5G) system is also referred to as a new radio (NR) system. A packet duplication mechanism is provided in the NR system. The packet duplication mechanism refers to a mechanism in which a packet data convergence protocol (PDCP) packet is duplicated into the same two PDCP packets, and then the same two PDCP packets are transmitted in parallel on different carriers or connections. For example, the same two PDCP packets are transmitted in parallel on two carriers of carrier aggregation. In another example, the same two PDCP packets are transmitted in parallel on two connections of dual connectivity.

Because the packet duplication mechanism is implemented at a PDCP layer, and a PDCP transceiver entity simultaneously processes uplink data and downlink data, the packet duplication mechanism in the related art can only be simultaneously turned on or off for uplink transmission and downlink transmission, which is more suitable for a transmission scenario of a symmetric service stream. However, in some service scenarios, the upstream service stream and the downstream service stream are asymmetric or hybrid, and are not suitable to be transmitted by using the packet duplication mechanism.

SUMMARY

According to embodiments of this application, a service data transmission method and apparatus, a computer device, and a non-transitory computer-readable storage medium are provided, which can be used for resolving the problem that the packet duplication mechanism in the related art is only applicable to the transmission scenario of the symmetric service stream. The technical solutions are as follow.

A service data transmission method is provided that can be performed by a terminal. The method can include splitting a service stream into a plurality of service substreams, the service stream including at least one of an asymmetric service stream and a hybrid service stream, establishing network slices respectively corresponding to the plurality of service substreams, and transmitting service data of each service substream by using the network slices corresponding to the each service substream, at least one service substream in the plurality of service substreams being transmitted by using a packet duplication mechanism.

A service data transmission method is provided that can be performed by a terminal. The method can include splitting a service stream into a plurality of service substreams, the service stream including at least one of an asymmetric service stream and a hybrid service stream, establishing connections respectively corresponding to the plurality of service substreams, the connections being connections that are irrelevant to a network slice or being quality of service streams in the network slice, and transmitting service data of each service substream by using the connections corresponding to the each service substream, at least one service substream in the plurality of service substreams being transmitted by using a packet duplication mechanism.

A service data transmission method is provided that is performed by a network-side network element. The method can include transmitting a policy configuration of a service stream to a terminal, the policy configuration being used for the terminal to split the service stream into a plurality of service substreams, and the service stream including at least one of an asymmetric service stream and a hybrid service stream, and establishing network slices respectively corresponding to the plurality of service substreams. The method can further include receiving, by using the network slices respectively corresponding to each service substream, the plurality of service substreams transmitted by the terminal, at least one service substream in the plurality of service substreams being transmitted by using a packet duplication mechanism.

A service data transmission method is provided that can be performed by a network-side network element. The method can include transmitting a policy configuration of a service stream to a terminal, the policy configuration being used for the terminal to split the service stream into a plurality of service substreams, and the service stream including at least one of an asymmetric service stream and a hybrid service stream, and establishing connections respectively corresponding to the plurality of service substreams, the connections being connections that are irrelevant to a network slice or being quality of service streams in the network slice. Further, the method can receiving, by using the connections respectively corresponding to each service substream, the plurality of service substreams transmitted by the terminal, at least one service substream in the plurality of service substreams being transmitted by using a packet duplication mechanism.

A service data transmission apparatus is provided, and the apparatus can include processing circuitry that is configured to split a service stream into a plurality of service substreams, the service stream including at least one of an asymmetric service stream and a hybrid service stream, and establish network slices respectively corresponding to the plurality of service substreams. The processing circuitry can be further configured to transmit service data of each service substream by using the network slices corresponding to the each service substream, at least one service substream in the plurality of service substreams being transmitted by using a packet duplication mechanism.

A service data transmission apparatus is provided, and the apparatus includes processing circuitry that can be configured to split a service stream into a plurality of service substreams, the service stream including at least one of an asymmetric service stream and a hybrid service stream, and establish connections respectively corresponding to the plurality of service substreams, the connections being connections that are irrelevant to a network slice or being quality of service streams in the network slice. Further, the processing circuitry can be configured to transmit service data of each service substream by using the connections corresponding to the each service substream, at least one service substream in the plurality of service substreams being transmitted by using a packet duplication mechanism.

A service data transmission apparatus is provided, and the apparatus can include processing circuitry that is configured to transmit a policy configuration of a service stream to a terminal, the policy configuration being used for the terminal to split the service stream into a plurality of service substreams, and the service stream including at least one of an asymmetric service stream and a hybrid service stream. The processing circuitry can be further configured to establish network slices respectively corresponding to the plurality of service substreams, and receive, by using the network slices respectively corresponding to each service substream, the plurality of service substreams transmitted by the terminal, at least one service substream in the plurality of service substreams being transmitted by using a packet duplication mechanism.

A service data transmission apparatus is provided, and the apparatus can include processing circuitry that is configured to transmit a policy configuration of a service stream to a terminal, the policy configuration being used for the terminal to split the service stream into a plurality of service substreams, and the service stream including at least one of an asymmetric service stream and a hybrid service stream. The processing circuitry can be further configured to establish connections respectively corresponding to the plurality of service substreams, and to receive, by using the connections respectively corresponding to each service substream, the plurality of service substreams transmitted by the terminal, at least one service substream in the plurality of service substreams being transmitted by using a packet duplication mechanism.

A terminal is provided, and the terminal includes a processor and a memory. The memory stores a computer program that, when executed by the processor, can implement the foregoing service data transmission method.

A network-side network element is provided, and the network-side network element includes a processor and a memory that stores a computer program that, when executed by the processor, can implement the foregoing service data transmission method.

A non transitory computer-readable storage medium is provided that includes a processor and a memory. The memory stores a computer program that, when executed by the processor, can implement the foregoing service data transmission method.

A computer program product is provided that includes a processor and a memory. The memory stores a computer program that, when executed by the processor, causes the processor to implement the foregoing service data transmission method.

Details of one or more exemplary embodiments of this disclosure are provided in the accompanying drawings and descriptions below. Other features and advantages of this disclosure become obvious with reference to the specification, the accompanying drawings, and the claims.

BRIEF DESCRIPTION OF THE DRAWINGS

To describe the technical solutions of the embodiments of this disclosure more clearly, the following briefly describes the accompanying drawings required for describing the embodiments. The accompanying drawings in the following description show only some embodiments of this disclosure, and a person of ordinary skill in the art may still derive other accompanying drawings according to these accompanying drawings.

DESCRIPTION OF EMBODIMENTS

To make the objectives, technical solutions, and advantages of this disclosure clearer, the following further describes implementations of this disclosure in detail with reference to the accompanying drawings.

Figure 1:
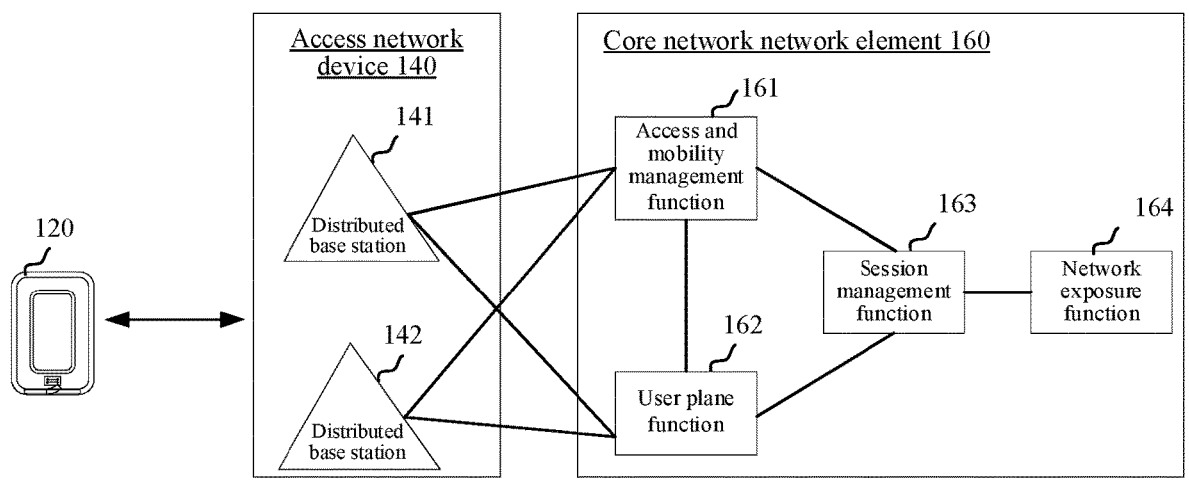
FIG. 1 is a schematic structural diagram of a mobile communication system according to an exemplary embodiment of this disclosure.

FIG. 1 shows a schematic structural diagram of a mobile communication system according to an exemplary embodiment of this disclosure. The mobile communication system may be a 5G system, also referred to as an NR system. As shown, the mobile communication system can include a terminal 120, an access network device 140, and a core network network element 160.

The terminal 120 may be also referred to as user equipment (UE), which may be a device that provides voice or data connectivity to a user. The terminal may communicate with one or more core networks through a radio access network (RAN). The terminal 140 may be a mobile terminal, such as a mobile phone (or referred to as a "cellular" phone) or a computer with a mobile terminal. For example, the terminal 140 may be a portable, pocket-sized, handheld, computer built-in, or in-vehicle mobile apparatus, such as a subscriber unit, a subscriber station, a mobile station, a mobile, a remote station, an access point, a remote terminal, an access terminal, a user terminal, a user agent, a user device or UE.

The terminal 120 and the access network device 140 establish a wireless connection through any wireless air interface. Optionally, the wireless air interface is a wireless air interface based on a 5G standard. For example, the wireless air interface is NR. Alternatively, the wireless air interface may be a wireless air interface based on a next-generation-of-5G mobile communication network technology standard.

The access network device 140 may be a base station. For example, the base station may be a next-generation Node B (gNB) using a centralized or distributed architecture in the 5G system. When using the centralized or distributed architecture, the access network device 120 generally includes a central unit (CU) and at least two distributed units (DU). The CU and the DU are provided with protocol stacks including service data adaptation protocol (SDAP) layer, a PDCP layer, a radio link control (RLC) layer, a physical (PHY) layer, and a media access control (MAC) layer. The arrangement of the protocol stacks in the CU and the DU are determined according to a logical function division method of the CU and the DU. A specific implementation of the access network device 140 is not limited in this embodiment of this disclosure. In this embodiment, an example in which the access network device 140 includes a base station 141 and a base station 142 is used for description. However, a quantity of access network devices 140 is not limited in this embodiment of this disclosure.

The access network device 140 and the core network network element 160 are connected wiredly or wirelessly. The wired connection may be implemented by using an optical fiber cable or a cable.

The core network network element 160 includes: an access and mobility function (AMF) 161, a user plane function (UPF) 162, a session management function (SMF) 163, and a network exposure function (NEF) 164. Optionally, for example, in FIG. 1, the AMF 161 is connected separately to the base station 141 and the base station 142, and the UPF 162 is connected separately to the base station 141 and the base station 142. In an actual operation, both the SMF 163 and the NEF 164 may be communicatively connected to the access network device 140. A communicative connection manner of the core network network element and the access network device 140 is not limited in this embodiment of this disclosure.

Figure 2:
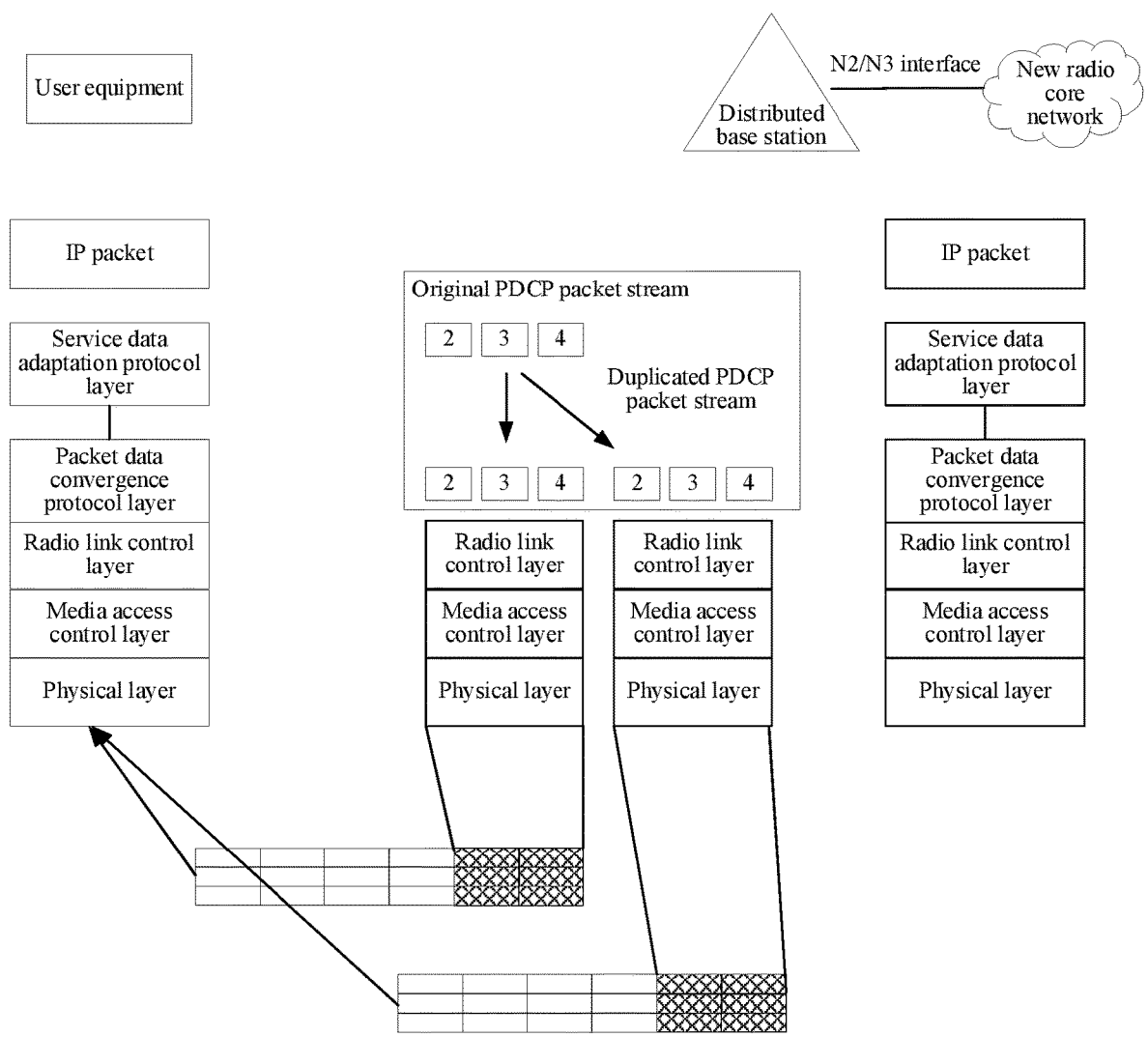
FIG. 2 is a schematic diagram of a transmission process of a packet duplication mechanism according to an exemplary embodiment of this disclosure.

FIG. 2 shows a diagram of a transmission principle of a packet duplication mechanism. The transport protocol layer in UE, from top to bottom, includes the application layer, the SDAP layer, the PDCP layer, the RLC layer, the MAC layer, and the PHY layer. Correspondingly, the transport protocol layer in the gNB, from top to bottom, includes the application layer, the SDAP layer, the PDCP layer, the RLC layer, the MAC layer, and the PHY layer. The gNB is also connected to a new radio core network 5GC via an N2/N3 interface.

The packet duplication mechanism means that for an original PDCP packet stream, two parallel and identical PDCP packet streams are formed through duplication, and then the two PDCP packet streams are transmitted on two carriers by using carrier aggregation (CA), or the two PDCP packet streams are transmitted on dual connectivity (DC). Because a group of original PDCP packet streams is transmitted in two parallel paths, the two paths of PDCP packet streams can be decoded with reference to each other at a receiving end, which improves the reliability of data transmission.

Because the packet duplication mechanism is implemented at the PDCP layer, and the PDCP transceiver entity processes simultaneously uplink data and downlink data. Therefore, the packet duplication mechanism in the related art can only be simultaneously turned on or off for uplink transmission and downlink transmission. However, in some service scenarios, the upstream service stream and the downstream service stream are asymmetric or hybrid, and are not suitable to be transmitted by using the packet duplication mechanism. Taking a cloud game running on a mobile phone as an example, an upstream service stream includes control data generated when a user operates the game, and a downstream service stream includes audio and video data generated by a server of the game. The upstream service stream, a loss of which significantly impacts user experience, is better to be transmitted by using the packet duplication mechanism, while the downstream service stream, which requires a large bandwidth, is not suitable to be transmitted by using the packet duplication mechanism.

Figure 3:
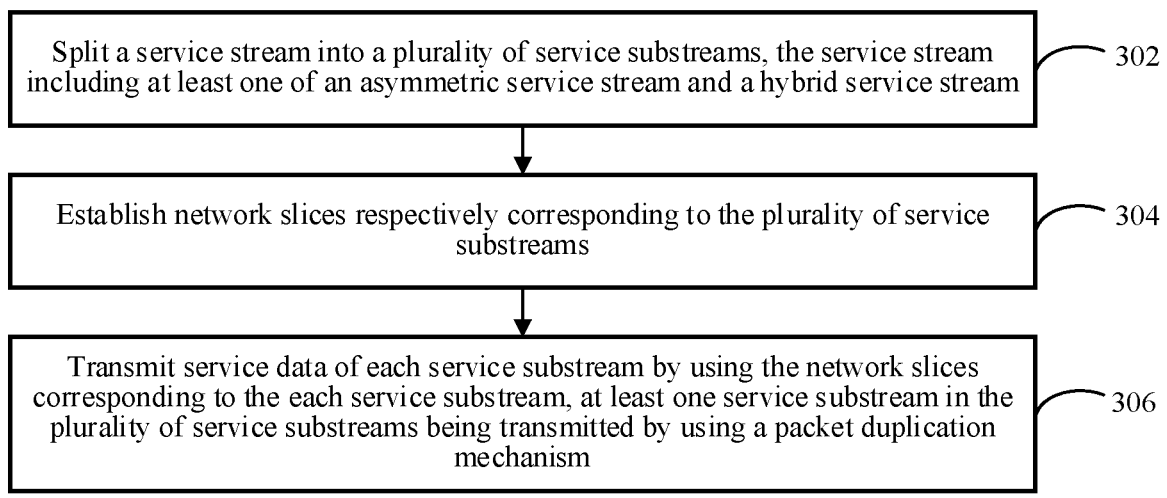
FIG. 3 is a flowchart of a service data transmission method according to an exemplary embodiment of this disclosure.

FIG. 3 shows a flowchart of a service data transmission method according to an exemplary embodiment of this disclosure. This embodiment is described by using an example in which the method is performed by the terminal shown in FIG. 1. The method can include the following.

In step 302, the method can split a service stream into a plurality of service substreams, the service stream including at least one of an asymmetric service stream and a hybrid service stream. Further, the service stream is a data stream obtained according to a service logic division of an application layer of the terminal. Service data in the service stream may be an IP packet. For example, service data of an application program is regarded as a service stream, service data of a game application program is regarded as a service stream, service data of a vehicle-to-everything application program is regarded as a service stream, and service data of a map navigation program is regarded as a service stream. In another example, service data of a background service without an application program interface is regarded as a service stream. In this disclosure, all the "plurality" means at least two.

According to a transmission direction, the service data can include service data in an uplink direction and service data in a downlink direction. The uplink direction refers to a direction in which the terminal transmits data to an access network device, and the downlink direction refers to a direction in which the access network device transmits data to the terminal.

According to a service type, the service data includes at least two of control data, map data, audio data, video data, and security warning data. A hybrid service stream refers to an existence of at least two different service types of service data in a service stream. An asymmetric service stream means that both uplink service data and downlink service data exist in a service stream, and quality of service requirements of the uplink service data and the downlink service data are different. A symmetric service stream means that both uplink service data and downlink service data exist in a service stream, and quality of service requirements of the uplink service data and the downlink service data are the same. Optionally, a service stream is an asymmetric service stream as well as a hybrid service stream. The quality of service requirement refers to a quality of service (QoS) or a service-level agreement (SLA).

In step 304 the method can establish network slices respectively corresponding to the plurality of service substreams. The network slice is a logical channel used for transmitting service data in a service substream. The terminal establishes network slices respectively corresponding to a plurality of service substreams, and each service substream corresponds to one or more network slices. Optionally, quality of service requirements provided by different network slices are different. Optionally, one network slice includes one PDU session, or one network slice includes a plurality of PDU sessions.

In step 306 the method can transmit service data of each service substream by using the network slices corresponding to the each service substream, at least one service substream in the plurality of service substreams being transmitted by using a packet duplication mechanism. At least one service substream in the plurality of service substream is used as a target service substream and adopts the packet duplication mechanism. The target service substream is a service substream whose quality of service requirement is higher than a preset condition.

Optionally, a network slice of the target service substream is a dual network slice using a packet duplication mechanism. After service data of the target service substream is duplicated into two paths of service data, the two paths of service data are transmitted on the dual network slice by using the packet duplication mechanism. Additionally, a network slice of the target service substream can include at least two QoS streams, and after service data of the target service substream is duplicated into two paths of service data, the two paths of service data are transmitted on different QoS streams in the same network slice by using the packet duplication mechanism.

In conclusion, in the method provided in this embodiment, an asymmetric service stream and/or a hybrid service stream are/is usually split into a plurality of service substreams, network slices respectively corresponding to each service substream are established, a network slice of at least one service substream performs transmission by using a packet duplication mechanism, and service data of an $i^{th}$ service substream is transmitted by using a connection corresponding to the $i^{th}$ service substream. In this case, different service substreams in a service stream are transmitted by using different network slices, where some service substreams are transmitted by using the packet duplication mechanism, and some other service substreams does not need to be transmitted by using the packet duplication mechanism. Service data of different transmission directions and/or different service types can also be transmitted by using the packet duplication mechanism in a proper manner, which resolves the problem that the packet duplication mechanism in the related art is only applicable to the transmission scenario of the symmetric service stream.

Figure 4:
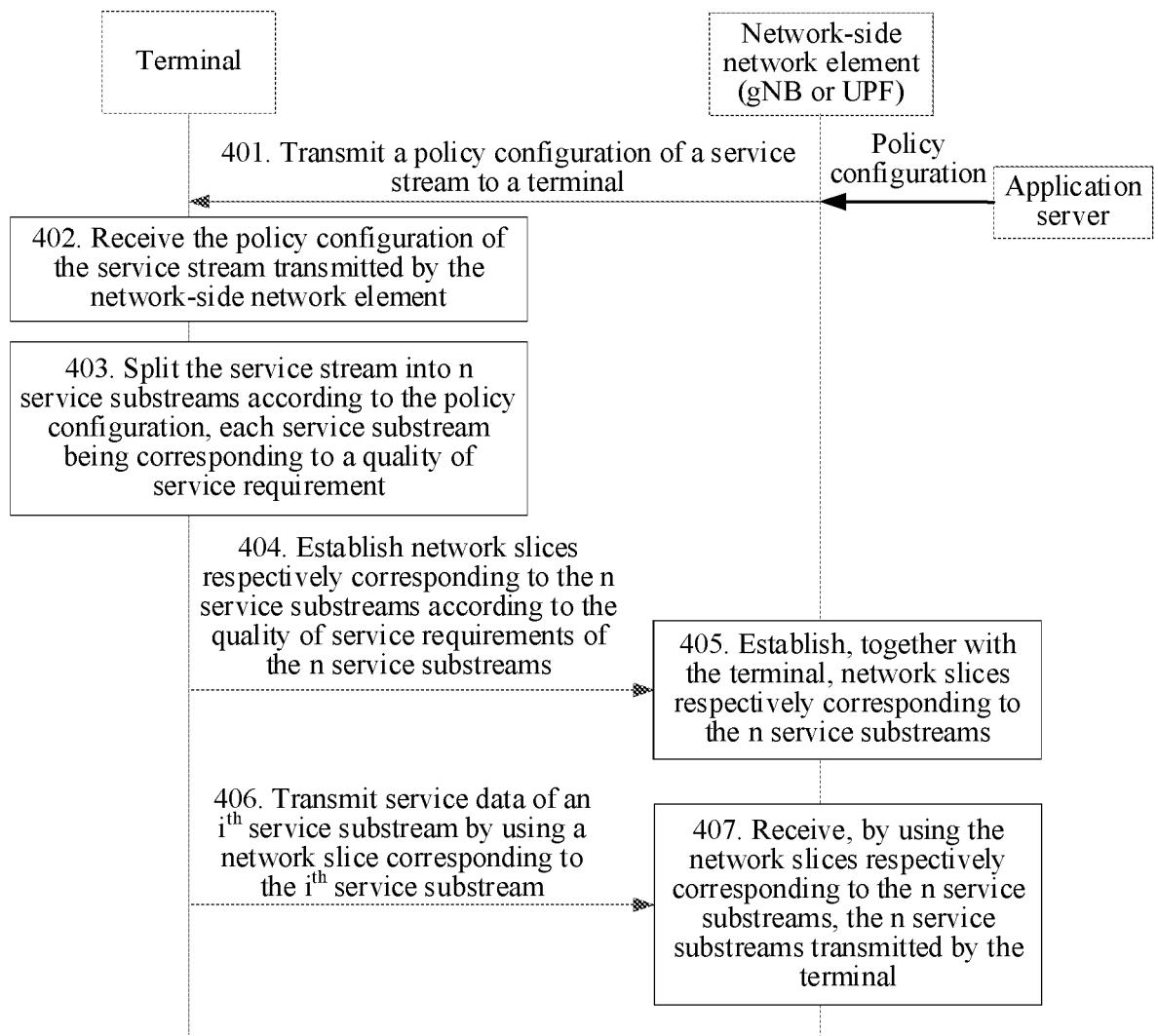
FIG. 4 is a flowchart of a service data transmission method according to an exemplary embodiment of this disclosure.

FIG. 4 shows a flowchart of a service data transmission method according to an exemplary embodiment of this disclosure. This embodiment is described by using an example in which the method is performed by the mobile communication system shown in FIG. 1. The method includes can include the following.

In step 401, a network-side network element transmits a policy configuration of a service stream to a terminal, the service stream including at least one of an asymmetric service stream and a hybrid service stream. The network-side network element may be a gNB or a UPF. The policy configuration is used for the terminal to split the service stream into n service substreams. Optionally, the network-side network element obtains the policy configuration of the terminal from an application server, and then forwards the policy configuration to the terminal. Further, the network-side network element can transmit the policy configuration to an application layer of the terminal in the form of an IP packet, so that an application program or a background program in the application layer processes the service stream according to the policy configuration.

In step 402, the terminal receives the policy configuration of the service stream transmitted by the network-side network element. The application layer of the terminal receives the policy configuration of the service stream transmitted by the network-side network element.

In step 403, the terminal splits the service stream into n service substreams according to the policy configuration, each service substream being corresponding to a quality of service requirement. The policy configuration can include splitting service data in the service stream into n service substreams according to a transmission direction and/or a service type. The service stream includes an asymmetric service stream and/or a hybrid service stream. Further, the terminal splits service data in the asymmetric service stream into n service substreams according to a transmission direction. The n service substreams include uplink service data and downlink service data, and service substreams in which the uplink service data and the downlink service data are located are different. In other words, the uplink service data and the downlink service data exist in different service substreams. The transmission direction includes an uplink direction and a downlink direction. N is a positive integer.

Optionally, the terminal splits service data in the hybrid service stream into n service substreams according to a service type. Service substreams in which service data of different service types is located are different. In other words, service data of different service types exists in different service substreams. The service data of different service types includes at least two of control data, map data, audio data, video data, and security warning data. Further, the terminal can split the service data belonging to different transmission directions and different service types into n service substreams. Each service substream corresponds to a quality of service requirement, and the quality of service requirement includes a QoS and/or SLA.

In step 404, the terminal can establish a network slices respectively corresponding to the n service substreams according to the quality of service requirements of the n service substreams. Optionally, the terminal calls an application programming interface (API) provided by a lower layer by using an application program, and the terminal establishes network slices respectively corresponding to a plurality of service substreams according to quality of service requirements respectively corresponding to the plurality of service substreams by using the application programming interface. The quality of service requirement is passed to the lower layer by the application program in the calling process. The lower layer refers to the protocol layer below the application layer. Further, the API can be an API provided by 5G network capability exposure.

Schematically, when a quality of service requirement of a service substream is greater than a preset condition, such as Ultra Reliable Low Latency Communications (uRLLC) service data with a higher reliability requirement, a dual network slice transmitted by using a packet duplication mechanism is established. Further, when a quality of service requirement of a service substream is less than a preset condition, such as Enhanced Mobile Broadband (eMBB) service data with a lower reliability requirement, a single network slice transmitted in the eMBB mode is established.

In step 405, the network-side network element and the terminal establish network slices can respectively corresponding to the n service substreams. The network slice is a network slice used for transmitting service data in a service substream. Optionally, for service substreams that are not transmitted by using the packet duplication mechanism, one network slice is established for one service substream. For service substreams that are transmitted by using the packet duplication mechanism, at least two network slices may be established for one service substream. Alternatively, one network slice is established for one service substream, but the network slice includes at least two QoS streams. Further, when the network-side network element is a UPF, the network slices of then service substreams of the terminal are connected to the same UPF, so that the service substreams can be forwarded to the application server more quickly. Certainly, in some embodiments, the network slices of the n service substreams may be alternatively connected to different UPFs.

In step 406, the terminal transmits service data of each service substream by using the network slices corresponding to the each service substream. The terminal transmits service data of each service substream by using the network slices corresponding to the each service substream. The each service substream is transmitted on the corresponding network slice by using different quality of service requirements.

At least one service substream is transmitted on a network slice corresponding to the at least one service substream by using a dual channel of the packet duplication mechanism. Optionally, at least one service substream is transmitted on a network slice corresponding to the at least one service substream via eMBB.

In step 407, the network-side network element receives, by using the network slices respectively corresponding to the n service substreams, the n service substreams transmitted by the terminal, and an $i^{th}$ service substream is transmitted by using a network slice corresponding to the $i^{th}$ service substream. After receiving the n service substreams transmitted by the terminal, the network-side network element forwards the service data of the n service substreams to the application server. i is an integer not greater than n.

In conclusion, in the method provided in this embodiment, an asymmetric service stream and/or a hybrid service stream are/is split into a plurality of service substreams, network slices respectively corresponding to each service substream are established, a network slice of at least one service substream performs transmission by using a packet duplication mechanism, and service data of an $i^{th}$ service substream is transmitted by using a network slice corresponding to the $i^{th}$ service substream. In this case, different service substreams in a service stream are transmitted by using different network slices, where some service substreams are transmitted by using the packet duplication mechanism, and some other service substreams does not need to be transmitted by using the packet duplication mechanism. Service data of different transmission directions and/or different service types can also be transmitted by using the packet duplication mechanism in a proper manner, which resolves the problem that the packet duplication mechanism in the related art is only applicable to the transmission scenario of the symmetric service stream.

In the method provided in this embodiment, an asymmetric service stream is split into n service substreams according to a transmission direction, so that service substreams in a transmission direction can be transmitted by using a packet duplication mechanism, and service substreams in the other transmission direction is not transmitted by using the packet duplication mechanism, so that service data in different transmission directions can be transmitted by using the packet duplication mechanism in a proper manner.

In the method provided in this embodiment, a hybrid service stream is split into n service substreams according to a service type, so that service substreams of some service types can be transmitted by using a packet duplication mechanism, and service substreams of other service types are transmitted via eMBB, so that service data of different service types can be transmitted by using the packet duplication mechanism in a proper manner.

Figure 5:
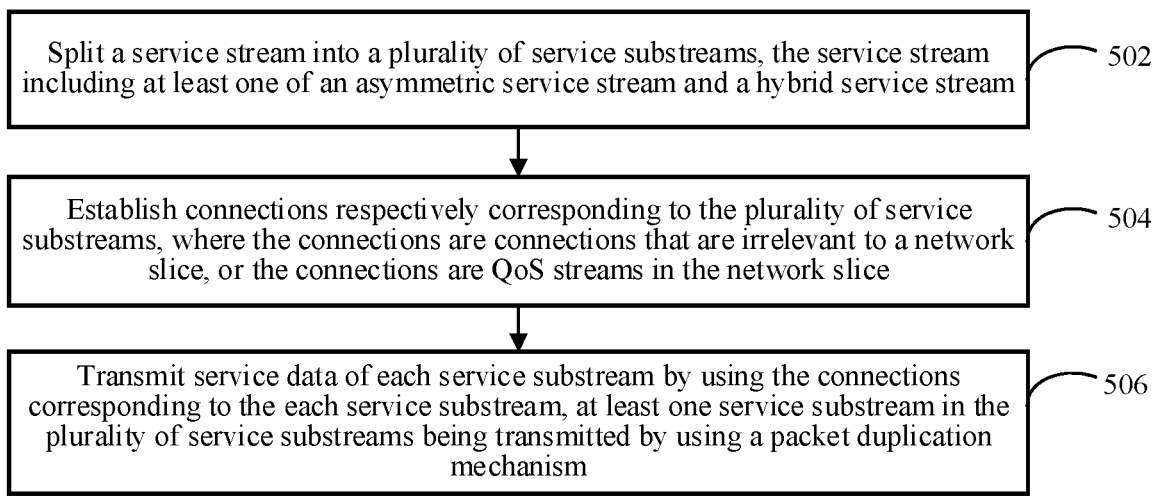
FIG. 5 is a flowchart of a service data transmission method according to an exemplary embodiment of this disclosure.

The foregoing embodiment is described by using an example in which a service substream is carried on a network slice for transmission. In other embodiments, a service substream may be alternatively transmitted by using another form of data channel. The following embodiments are made for reference:

FIG. 5 shows a flowchart of a service data transmission method according to an exemplary embodiment of this application. This embodiment is described by using an example in which the method is performed by the terminal shown in FIG. 1. The method can include the following.

In step 502, the method can split a service stream into a plurality of service substreams, the service stream including at least one of an asymmetric service stream and a hybrid service stream. For the description of step 502, refer to the description of step 302.

In step 504, the method can establish connections respectively corresponding to the plurality of service substreams, where the connections are connections that are irrelevant to a network slice, or the connections are QoS streams in the network slice. The connection is a logical channel used for transmitting service data in a service substream. Optionally, different service substreams are carried on different QoS streams for transmission, and different QoS streams belong to the same or different network slices. Optionally, different service substreams may be carried on different connections for transmission. The connections are connections that are irrelevant to a network slice. For example, the connections are at least one of a PDU session, carrier, and access connections of different access network devices (or different access modes) that are irrelevant to the network slice.

In step 506, the method can transmit service data of each service substream by using the connections corresponding to the each service substream, at least one service substream in the plurality of service substreams being transmitted by using a packet duplication mechanism. At least one target service substream is transmitted by using the packet duplication mechanism, and the target service substream is a service substream whose quality of service requirement is higher than a preset condition. Optionally, at least one service substream is transmitted via eMBB.

In conclusion, in the method provided in this embodiment, an asymmetric service stream and a hybrid service stream are split into a plurality of service substreams, connections respectively corresponding to each service substream are established, a connection of at least one service substream performs transmission by using a packet duplication mechanism, and service data of an $i^{th}$ service substream is transmitted by using a connection corresponding to the $i^{th}$ service substream. In this case, different service substreams in a service stream are transmitted by using different connections, where some service substreams are transmitted by using the packet duplication mechanism, and some other service substreams does not need to be transmitted by using the packet duplication mechanism. Service data of different transmission directions and/or different service types can also be transmitted by using the packet duplication mechanism in a proper manner, which resolves the problem that the packet duplication mechanism in the related art is only applicable to the transmission scenario of the symmetric service stream.

Figure 6:
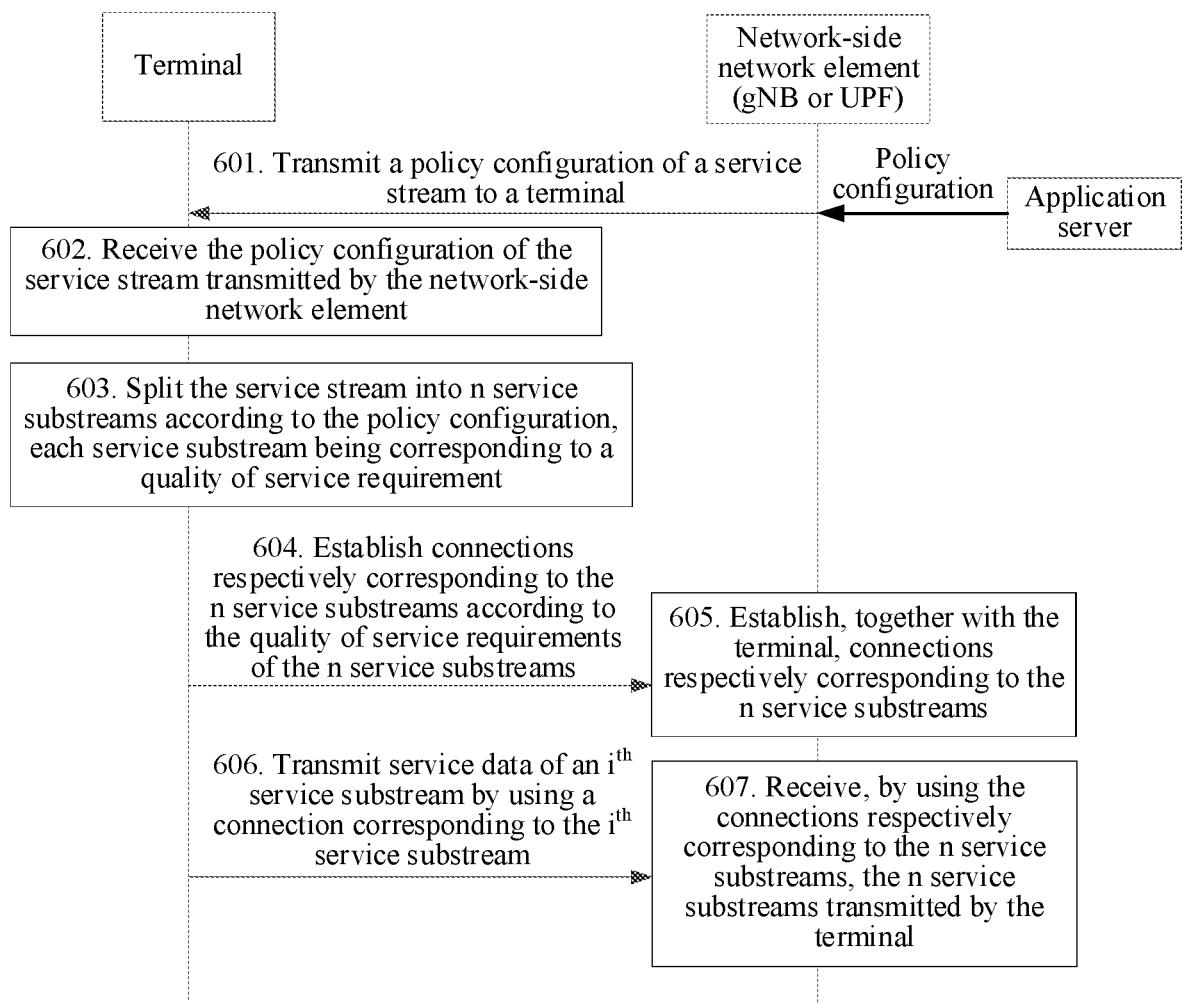
FIG. 6 is a flowchart of a service data transmission method according to an exemplary embodiment of this disclosure.

FIG. 6 shows a flowchart of a service data transmission method according to an exemplary embodiment of this disclosure. This embodiment is described by using an example in which the method is performed by the mobile communication system shown in FIG. 1. The method can include the following.

In step 601 a network-side network element transmits a policy configuration of a service stream to a terminal, the service stream including at least one of an asymmetric service stream and a hybrid service stream. The network-side network element may be a gNB or a UPF. The policy configuration is used for the terminal to split the service stream into n service substreams. Optionally, the network-side network element obtains the policy configuration of the terminal from an application server, and then forwards the policy configuration to the terminal. Optionally, the network-side network element transmits the policy configuration to an application layer of the terminal in the form of an IP packet, so that an application program or a background program in the application layer processes the service stream according to the policy configuration.

In step 602, the terminal receives the policy configuration of the service stream transmitted by the network-side network element. The application layer of the terminal receives the policy configuration of the service stream transmitted by the network-side network element.

In step 603, the terminal splits the service stream into n service substreams according to the policy configuration, each service substream being corresponding to a quality of service requirement. The policy configuration includes: splitting service data in the service stream into n service substreams according to at least one of a transmission direction and a service type. The service stream includes at least one of an asymmetric service stream and a hybrid service stream.

Optionally, the terminal splits service data in the asymmetric service stream into n service substreams according to a transmission direction. The n service substreams include uplink service data and downlink service data, and service substreams in which the uplink service data and the downlink service data are located are different. In other words, the uplink service data and the downlink service data exist in different service substreams. The transmission direction can include an uplink direction and a downlink direction.

Optionally, the terminal splits service data in the hybrid service stream into n service substreams according to a service type. Service substreams in which service data of different service types is located are different. In other words, service data of different service types exists in different service substreams. The service data of different service types includes at least two of control data, map data, audio data, video data, and security warning data. Further, the terminal can split the service data belonging to different transmission directions and different service types into n service substreams. Each service substream corresponds to a quality of service requirement, and the quality of service requirement can include at least one of QoS and SLA.

In step 604, the terminal establishes connections respectively corresponding to the n service substreams according to the quality of service requirements of the n service substreams. Optionally, the terminal calls an application programming interface (API) provided by a lower layer by using an application program, and the terminal establishes connections respectively corresponding to a plurality of service substreams according to quality of service requirement respectively corresponding to the plurality of service substreams, by using the lower layer. The quality of service requirement is passed to the lower layer by the application program in the calling process. The lower layer refers to the protocol layer below the application layer. Optionally, the API is an API provided by 5G network capability exposure.

Schematically, when a quality of service requirement of a service substream is greater than a preset condition, such as uRLLC service data with a higher reliability requirement, a dual connectivity using a packet duplication mechanism is established. Further, when a quality of service requirement of a service substream is less than a preset condition, such as eMBB service data with a lower reliability requirement, a single connection transmitted in the eMBB mode is established.

In this embodiment, the connections are connections that are irrelevant to a network slice, or the connections are QoS streams in the network slice. Optionally, different service substreams are carried on different QoS streams for transmission, and different QoS streams belong to the same or different network slices. Further, different service substreams may be carried on different connections for transmission. The connections are connections that are irrelevant to a network slice. For example, the connections are at least one of a PDU session, carrier, and access connections of different access network devices (or different access modes) that are irrelevant to the network slice.

In step 605, the network-side network element and the terminal establish connections respectively corresponding to the n service substreams. The connection is a connection used for transmitting service data in a service substream. Optionally, for service substreams that are not transmitted by using the packet duplication mechanism, one connection is established for one service substream; for service substreams that are transmitted by using the packet duplication mechanism, at least two connections may be established for one service substream. Optionally, when the network-side network element is a UPF, the connections of the n service substreams of the terminal are connected to the same UPF, so that the service substreams can be forwarded to the application server more quickly. Certainly, in some embodiments, the connections of the n service substreams may be alternatively connected to different UPFs.

In step 606, the terminal transmits service data of each service substream by using the connections corresponding to the each service substream. The terminal transmits service data of each service substream by using the connections corresponding to the each service substream. The each service substream is transmitted on the corresponding connection by using different quality of service requirements. At least one service substream is transmitted on a connection corresponding to the at least one service substream by using a dual channel of the packet duplication mechanism. Optionally, at least one service substream is transmitted on a connection corresponding to the at least one service substream via eMBB.

In step 607, the network-side network element receives, by using the connections respectively corresponding to the n service substreams, the n service substreams transmitted by the terminal, and an $i^{th}$ service substream is transmitted by using a connection corresponding to the $i^{th}$ service substream. After receiving the n service substreams transmitted by the terminal, the network-side network element forwards the service data of the n service substreams to the application server.

In conclusion, in the method provided in this embodiment, an asymmetric service stream and/or a hybrid service stream are/is split into a plurality of service substreams, connections respectively corresponding to each service substream are established, a connection of at least one service substream performs transmission by using a packet duplication mechanism, and service data of an $i^{th}$ service substream is transmitted by using a connection corresponding to the $i^{th}$ service substream. In this case, different service substreams in a service stream are transmitted by using different connections, where some service substreams are transmitted by using the packet duplication mechanism, and some other service substreams does not need to be transmitted by using the packet duplication mechanism. Service data of different transmission directions and/or different service types can also be transmitted by using the packet duplication mechanism in a proper manner, which resolves the problem that the packet duplication mechanism in the related art is only applicable to the transmission scenario of the symmetric service stream.

In the method provided in this embodiment, an asymmetric service stream is split into n service substreams according to a transmission direction, so that service substreams in a transmission direction can be transmitted by using a packet duplication mechanism, and service substreams in the other transmission direction is not transmitted by using the packet duplication mechanism, so that service data in different transmission directions can be transmitted by using the packet duplication mechanism in a proper manner.

In the method provided in this embodiment, a hybrid service stream is split into n service substreams according to a service type, so that service substreams of some service types can be transmitted by using a packet duplication mechanism, and service substreams of other service types are transmitted via eMBB, so that service data of different service types can be transmitted by using the packet duplication mechanism in a proper manner.

Figure 7:
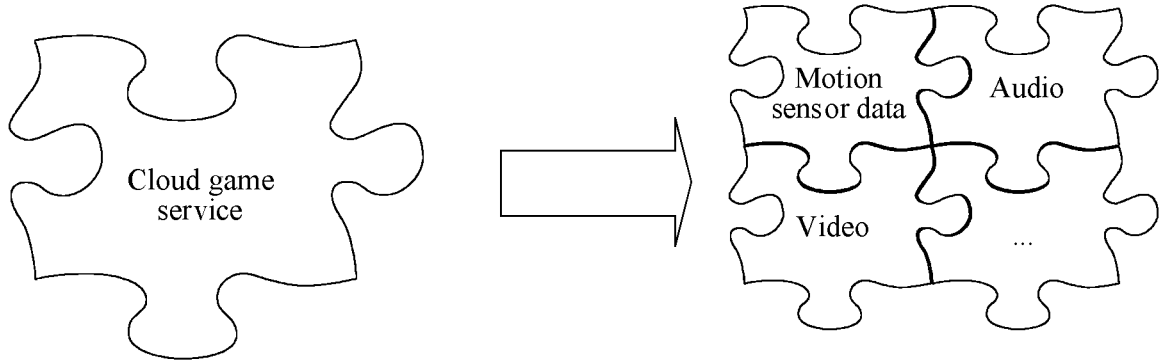
FIG. 7 is a service division diagram of a cloud game service according to an exemplary embodiment of this disclosure.

In an exemplary example shown in FIG. 7, assuming that an application program is a game program, and a service stream of the application program belongs to a cloud game service, the service stream of the application program includes motion sensor data, audio, and video. The application server delivers a first policy configuration to an application layer of the terminal, and the application layer of the terminal splits, according to the first policy configuration, the service stream into three service substreams: a motion sensor data service substream, an audio transmission service substream, and a video transmission service substream. Each service substream corresponds to a different QoS or SLA. According to the QoS or SLA of the each service substream, the terminal transmits a request to the network-side network element to establish a connection based on the network slice (or a connection that is irrelevant to the network slice). Then, the terminal implements transmission in different manners according to the connections established for the each service substream. For example, the motion sensor data service substream is transmitted by using a packet duplication mechanism of a uRLLC service, and the audio transmission service substream and the video transmission service substream are transmitted by using a transmission mechanism of an eMBB service.

Figure 8:
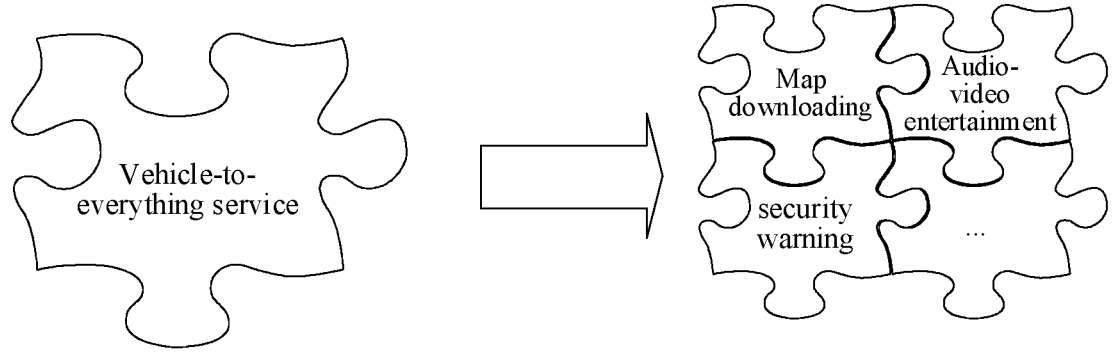
FIG. 8 is a service division diagram of a vehicle-to-everything service according to an exemplary embodiment of this disclosure.

In an exemplary example shown in FIG. 8, assuming that an application program is a vehicle-to-everything program, and a service stream of the application program belongs to a vehicle-to-everything service, the service stream of the application program includes map downloading, audio-video entertainment, and a security warning. The application server delivers a second policy configuration to an application layer of the terminal, and the application layer of the terminal splits, according to the second policy configuration, the service stream into three service substreams: a map downloading data service substream, a video-audio entertainment service substream, and a security warning service substream. Each service substream corresponds to a different QoS or SLA. According to the QoS or SLA of the each service substream, the terminal transmits a request to the network-side network element to establish a connection based on the network slice (or a connection that is irrelevant to the network slice). Then, the terminal implements transmission in different manners according to the connections established for the each service substream. For example, the map data downloading service substream and the security warning service substream are transmitted by using a packet duplication mechanism of a uRLLC service, and the video-audio entertainment service substream is transmitted by using a transmission mechanism of an eMBB service.

Figure 9:
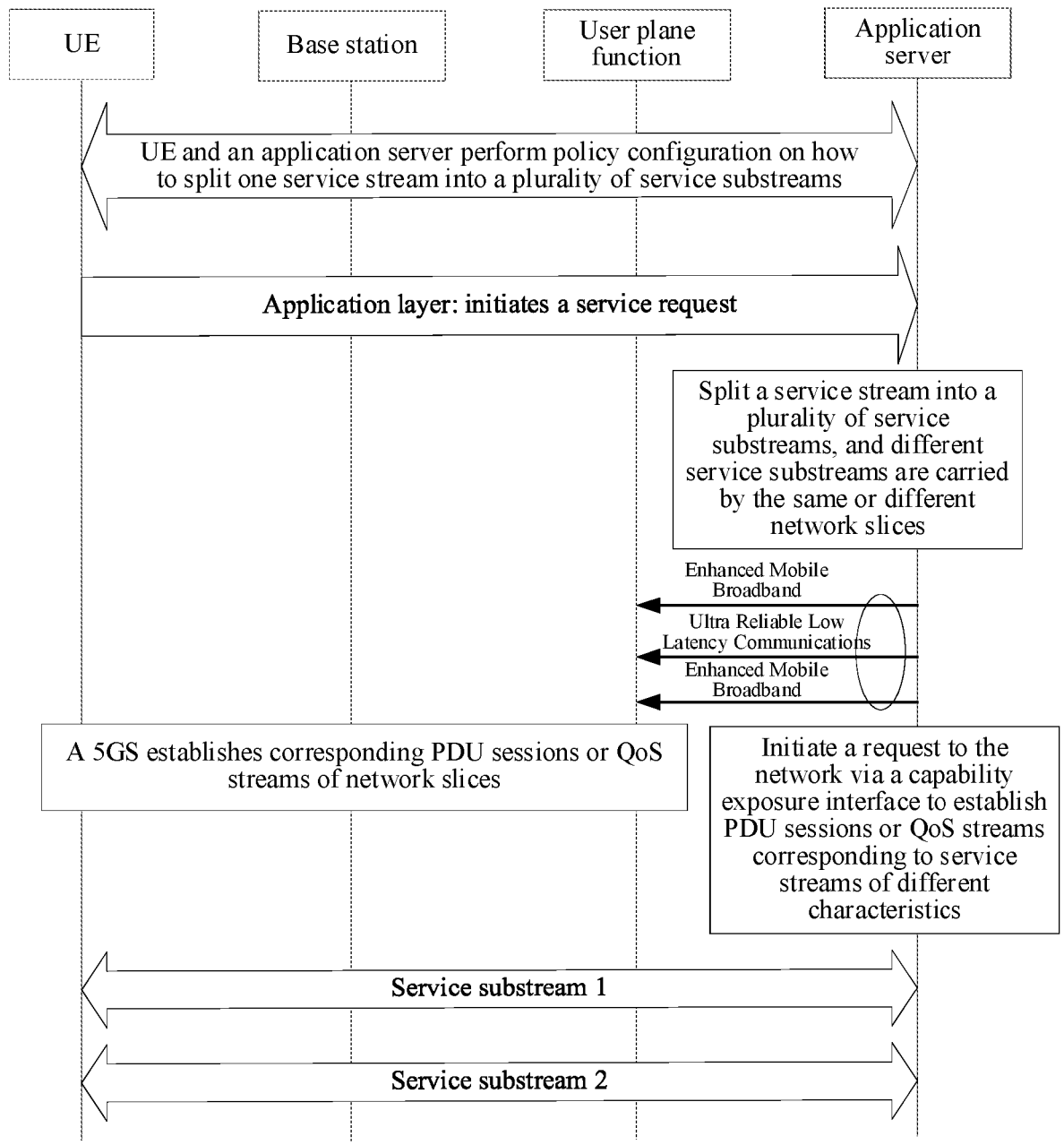
FIG. 9 is a flowchart of a service data transmission method according to an exemplary embodiment of this disclosure.

In an exemplary example shown in FIG. 9, UE and an application server perform policy configuration on how to split one service into a plurality of sub-services. The policy configuration may be transmitted to the UE by the application server. An application layer of the UE initiates a service request to the application server. The application layer of the UE also splits a service stream into a plurality of service substreams according to the policy configuration. Different service substreams are carried by the same or different network slices. For example, one service stream is split into one service substream of a uRLLC type and two service substreams of an eMBB type. The UE and the network-side network element establish corresponding PDU sessions or QoS streams of network slices for n service substreams. Optionally, the UE initiates a request to the network-side network element via a capability exposure interface to establish PDU sessions or QoS streams corresponding to service streams of different characteristics. Based on the PDU sessions or the QoS streams established for each service substream, the n service substreams are transmitted between the UE and the application server. In this figure, an example in which the network-side network element is a UPF is used as an example for description.

It is to be understood that, steps in flowcharts of FIG. 3 to FIG. 6 are displayed in sequence based on indication of arrows, but the steps are not necessarily performed in sequence based on a sequence indicated by the arrows. Unless explicitly specified in this application, execution of the steps is not strictly limited, and the steps may be performed in other sequences. In addition, at least some steps in FIG. 3 to FIG. 6 may include a plurality of substeps or a plurality of stages. The substeps or the stages are not necessarily performed at a same moment, and instead may be performed at different moments. A performing sequence of the substeps or the stages is not necessarily performing in sequence, and instead may be performing in turn or alternately with another step or at least some of substeps or stages of the another step.

Apparatus embodiments of this disclosure are described below. For details that are not described in the apparatus embodiments, refer to the foregoing method embodiments in a one-to-one correspondence to the apparatus embodiments.

Figure 10:
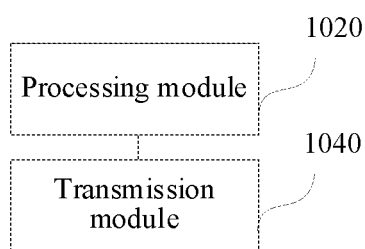
FIG. 10 is a block diagram of a service data transmission apparatus according to an exemplary embodiment of this disclosure.

FIG. 10 shows a block diagram of a service data transmission apparatus according to an exemplary embodiment of this disclosure. The apparatus may be implemented as the entire or a part of a terminal by using software, hardware, or a combination thereof. The apparatus includes a processing module 1020 and a transmission module 1040. Of course, it should be understood that one or more of the modules described in this disclosure can be implemented by hardware, such as circuitry.

The processing module 1020 is configured to split a service stream into a plurality of service substreams, the service stream including at least one of an asymmetric service stream and a hybrid service stream. The processing module 1020 is further configured to establish network slices respectively corresponding to the plurality of service substreams.

The transmission module 1040 is configured to transmit service data of each service substream by using the network slices corresponding to the each service substream, at least one service substream in the plurality of service substreams being transmitted by using a packet duplication mechanism.

In an optional embodiment, the processing module 1020 is configured to split the service stream into n service substreams according to a policy configuration, each service substream being corresponding to a quality of service requirement, and n being a positive integer; and establish the network slices respectively corresponding to the each service substream according to the quality of service requirement of the each service substream.

In an optional embodiment, the service stream is the asymmetric service stream; and the processing module 1020 is configured to split service data in the asymmetric service stream into n service substreams according to a transmission direction, where the transmission direction includes: at least one of an uplink direction and a downlink direction.

In an optional embodiment, the service stream is the hybrid service stream; and the processing module 1020 is configured to split service data in the hybrid service stream into n service substreams according to a service type, where the service data of different service types includes at least two of control data, map data, audio data, video data, and security warning data.

In an optional embodiment, the processing module 1020 is configured to call an application programming interface provided by a lower layer by using an application program; and establish the network slices respectively corresponding to the n service substreams according to the quality of service requirement of the n service substreams by using the application programming interface, the quality of service requirement being passed to the lower layer by the application program in the calling process.

In an optional embodiment, a network slice corresponding to at least one service substreams performs transmission via eMBB. The network slice can be connected to the same or different network-side network elements. The network-side network element may be a UPF.

In some optional embodiments, the network slice may be alternatively replaced with a connection. The connection is a connection that is irrelevant to the network slice, or is a quality of service stream in the network slice.

In another optional embodiment, another service data transmission apparatus is provided. The apparatus may be implemented as the entire or a part of a terminal by using software, hardware, or a combination thereof. The apparatus includes a processing module and a transmission module.

The processing module is configured to split a service stream into a plurality of service substreams, the service stream including at least one of an asymmetric service stream and a hybrid service stream.

The processing module is configured to establish connections respectively corresponding to the plurality of service substreams, the connections being connections that are irrelevant to a network slice or being quality of service streams in the network slice.

The transmission module is configured to transmit service data of each service substream by using the connections corresponding to the each service substream, at least one service substream in the plurality of service substreams being transmitted by using a packet duplication mechanism.

Figure 11:
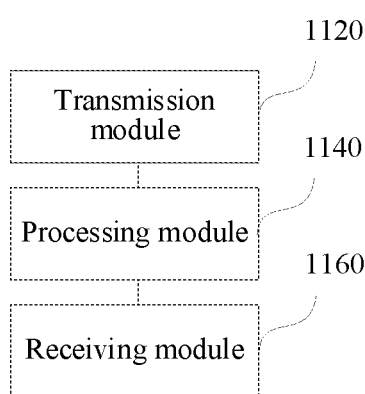
FIG. 11 is a block diagram of a service data transmission apparatus according to an exemplary embodiment of this disclosure.

FIG. 11 shows a block diagram of a service data transmission apparatus according to an exemplary embodiment of this disclosure. The apparatus may be implemented as the entire or a part of a network-side network element by using software, hardware, or a combination thereof. The network-side network element may be a gNB or UPF, and the apparatus includes: a transmission module 1120, a processing module 1140, and a receiving module 1160.

The transmission module 1120 is configured to transmit a policy configuration of a service stream to a terminal, the policy configuration being used for the terminal to split the service stream into a plurality of service substreams, and the service stream including at least one of an asymmetric service stream and a hybrid service stream.

The processing module 1140 is configured to establish network slices respectively corresponding to the plurality of service substreams.

The receiving module 1160 is configured to receive, by using the network slices respectively corresponding to each service substream, the plurality of service substreams transmitted by the terminal, at least one service substream in the plurality of service substreams being transmitted by using a packet duplication mechanism.

In an optional embodiment, the policy configuration includes: splitting service data in the asymmetric service stream into n service substreams according to a transmission direction, service substreams in which uplink service data and downlink service data are located being different, and n being a positive integer.

The transmission direction can include at least one of an uplink direction and a downlink direction.

In an optional embodiment, the policy configuration can include splitting service data in the hybrid service stream into n service substreams according to a service type, service substreams in which service data of different service types is located being different, and n being a positive integer.

The service data of different service types includes at least two of control data, map data, audio data, video data, and security warning data.

In some optional embodiments, the network slice may be alternatively replaced with a connection. The connection is a connection that is irrelevant to the network slice, or is a quality of service stream in the network slice.

In another optional embodiment, another service data transmission apparatus is provided. The apparatus may be implemented as the entire or a part of a network-side network element by using software, hardware, or a combination thereof. The apparatus includes a processing module, a transmission module, and a receiving module.

The transmission module is configured to transmit a policy configuration of a service stream to a terminal, the policy configuration being used for the terminal to split the service stream into a plurality of service substreams, the service stream including at least one of an asymmetric service stream and a hybrid service stream.

The processing module is configured to establish connections respectively corresponding to the plurality of service substreams.

The receiving module is configured to receive, by using the connections respectively corresponding to each service substream, the plurality of service substreams transmitted by the terminal, at least one service substream in the plurality of service substreams being transmitted by using a packet duplication mechanism.

The service data transmission apparatus may be implemented in the form of a computer program, and the computer program may be run on a terminal. A storage medium on the terminal may store program modules that constitute the service data transmission apparatus, for example, the processing module 1020 and the transmission module 1040 shown in FIG. 10, and the transmission module 1120, the processing module 1140, and the receiving module 1160 shown in FIG. 11. The computer program formed by the program modules, when run by a processor, causes the processor to perform the steps of the service data transmission method according to the embodiments of this disclosure.

The solutions provided in the embodiments of the present disclosure are described above mainly from a perspective of interaction between the network-side network element and the terminal. It may be understood that, to implement the foregoing functions, the network-side network element and the terminal includes corresponding hardware structures and/or software modules for performing the functions. With reference to units and algorithm steps in the examples described in the embodiments of the present disclosure, this embodiment of the present disclosure can be implemented by using hardware or a combination of hardware and computer software. Whether a function is performed by hardware or hardware driven by computer software depends on particular applications and design constraints of the technical solutions. A person skilled in the art may use different methods to implement the described functions for each particular application, but it is not to be considered that the implementation goes beyond the scope of the technical solutions in the embodiments of the present disclosure.

Figure 12:
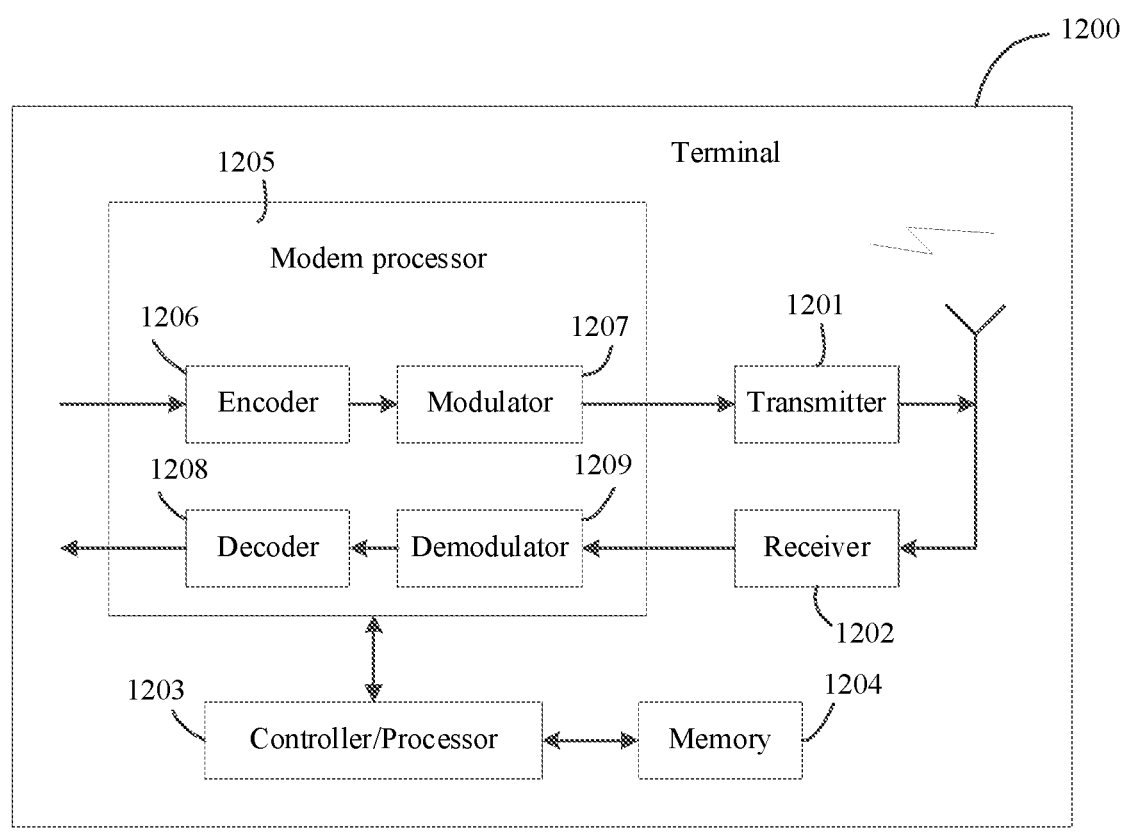
FIG. 12 is a structural block diagram of a terminal according to an exemplary embodiment of this disclosure.

FIG. 12 is a schematic structural diagram of a terminal according to an exemplary embodiment.

The terminal 1200 includes a transmitter 1201, a receiver 1202, and a processor 1203. The processor 1203 may be alternatively a controller, represented as a "controller/processor 1203" in FIG. 12. Optionally, the terminal 1200 may further include a modem processor 1205. The modem processor 1205 may include an encoder 1206, a modulator 1207, a decoder 1208, and a demodulator 1209. The encoder 1206, the modulator 1207, the demodulator 1209, and the decoder 1208 may be implemented by the combined modem processor 1205. These units perform processing based on a radio access technology (for example, LTE and an access technology of another evolved system) used in a radio access network. When the terminal 1200 does not include the modem processor 1205, the foregoing function of the modem processor 1205 may be implemented by the processor 1203.

In an example, the transmitter 1201 adjusts (for example, performs analog conversion, filtering, amplification, and up-conversion on) the output sampling and generates an uplink signal. The uplink signal is transmitted to the network-side network element in the foregoing embodiment by using an antenna. In a downlink, the antenna receives a downlink signal transmitted by the network-side network element in the foregoing embodiments.

The receiver 1202 adjusts (for example, filters, amplifies, down-converts, and digitizes) a signal received from the antenna and provides input sampling. In the modem processor 1205, an encoder 1206 receives service data and a signaling message that are to be transmitted on an uplink, and processes (for example, performs formatting, encoding, and interleaving on) the service data and the signaling message.

The modulator 1207 further processes (for example, performs symbol mapping and modulation on) the encoded service data and signaling message and provides output sampling. The demodulator 1209 processes (for example, demodulates) the input sampling and provides symbol estimation.

The decoder 1208 processes (for example, performs deinterleaving and decoding on) the symbol estimation and provides decoded data and signaling message to be transmitted to the terminal 1200.

The processor 1203 controls and manages an action of the terminal 1200, and is configured to perform the foregoing processing process performed by the terminal 1200 in this embodiment of the present disclosure. For example, the processor 1203 is further configured to perform steps on the terminal side in the foregoing method embodiments, and/or other steps of the technical solutions described in the embodiments of the present disclosure.

Further, the terminal 1200 may further include a memory 1204. The memory 1204 is configured to store program code and data that are used for the terminal 1200.

It may be understood that FIG. 12 shows merely a simplified design of the terminal 1200. During actual application, the terminal 1200 may include any quantity of transmitters, receivers, processors, modem processors, memories, and the like. All terminals that can implement the embodiments of the present disclosure fall within the protection scope of the embodiments of the present disclosure.

Figure 13:
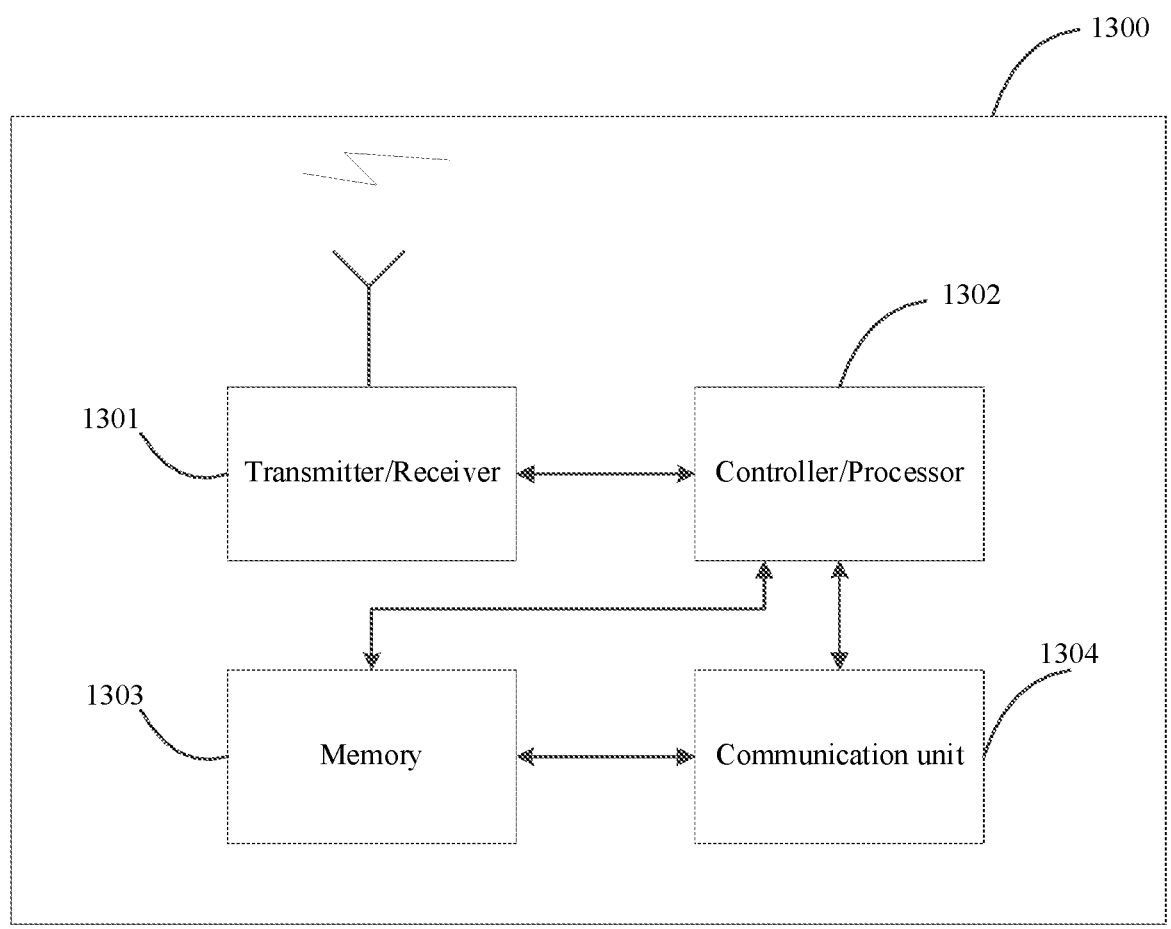
FIG. 13 is a structural block diagram of a network-side network element according to an exemplary embodiment of this disclosure.

FIG. 13 is a schematic structural diagram of a network-side network element according to an exemplary embodiment.

The network-side network element 1300 includes a transmitter/receiver 1301 and a processor 1302. The processor 1302 may be alternatively a controller, represented as a "controller/processor 1302" in FIG. 13. The transmitter/receiver 1301 is configured to support information transmission and receiving between the network-side network element and the terminal in the foregoing embodiment, and support communication between the network-side network element and other network entities. The processor 1302 performs various functions for communicating with the terminal. The foregoing demodulation or modulation function may be alternatively performed by the processor 1302. For example, the processor 1302 is further configured to perform steps on the network-side network element in the foregoing method embodiments, and/or other steps of the technical solutions described in the embodiments of the present disclosure.

On an uplink, an uplink signal from the terminal is received by an antenna, is demodulated by the receiver 1301 (for example, a high frequency signal is demodulated into a baseband signal), and is further processed by the processor 1302, to recover service data and a signaling message transmitted by the terminal. On a downlink, service data and a signaling message are processed by the processor 1302, and are modulated by the transmitter 1301 (for example, a baseband signal is modulated to a high frequency signal) to generate a downlink signal, and the downlink signal is transmitted to the terminal by using the antenna.

Further, the network-side network element 1300 may further include a memory 1303. The memory 1303 is configured to store program code and data of the network-side network element 1300. In addition, the network-side network element 1300 may further include a communication unit 1304.

When the network-side network element 1300 is a gNB, the communication unit 1304 is configured to support the gNB 1300 in performing communication with other network entities (for example, a network device in a core network). For example, in a 5G NR system, the communication unit 1304 may be an NG-U interface, configured to support communication between the gNB 1300 and a UPF entity. Alternatively, the communication unit 1304 may be an NG-C interface, configured to support communication between the gNB 1300 and an AMF entity.

It may be understood that, FIG. 13 merely shows a simplified design of the network-side network element 1300. During actual application, the network-side network element 1300 may include any quantity of transmitters, receivers, processors, controllers, memories, communication units, and the like. All network-side network elements that can implement the embodiments of the present disclosure fall within the protection scope of the embodiments of the present disclosure.

An embodiment of the present disclosure further provides a non-transitory computer-readable storage medium, which stores a computer program. The computer program, when executed by a processor of a network-side network element, implements the service data transmission method of the network-side network element side described above.

An embodiment of the present disclosure further provides a non-transitory computer-readable storage medium, which stores a computer program. The computer program, when executed by a processor of a terminal, implements the service data transmission method of the terminal side described above.

An embodiment of the present disclosure further provides a computer program product, which stores a computer program. The computer program, when executed by a processor of a network-side network element, implements the service data transmission method of the network-side network element side described above.

An embodiment of the present disclosure further provides a computer program product, which stores a computer program. The computer program, when executed by a processor of a terminal, implements the service data transmission method of the terminal side described above.

The sequence numbers of the foregoing embodiments of this disclosure are merely for description purpose but do not indicate the preference among the embodiments.

A person of ordinary skill in the art may understand that all or some of the steps of the embodiments may be implemented by hardware or a program instructing related hardware. The program may be stored in a computer-readable storage medium. The storage medium may be: a read-only memory, a magnetic disk, or an optical disc.

Technical features of the embodiments may be randomly combined. To make description concise, not all possible combinations of the technical features in the embodiments are described. However, as long as combinations of these technical features do not contradict each other, it is to be considered that the combinations all fall within the scope recorded by this specification.

The embodiments only show several implementations of this disclosure and are described in detail, but they should not be construed as a limit to the patent scope of the present disclosure. A person of ordinary skill in the art may make various changes and improvements without departing from the ideas of this disclosure, which shall all fall within the protection scope of this disclosure. Therefore, the protection scope of the patent of this disclosure shall be subject to the appended claims.

What is claimed is:

1. A service data transmission method performed by a terminal, the method comprising:
    splitting a service stream into a plurality of service substreams, wherein the splitting step includes splitting the service stream based on a service type when the service stream is a hybrid service stream with at least two different service types of service data including at least two of control data, map data, audio data, video data, and security warning data, and splitting the service stream based on a transmission direction when the service stream is an asymmetric service stream including both uplink service data and downlink service data;
    establishing network slices respectively corresponding to the plurality of service substreams; and
    transmitting service data of each service substream of the plurality of service substreams by using the established network slices, at least one service substream in the plurality of service substreams being transmitted by using a packet duplication mechanism.

2. The method according to claim 1, wherein the step of splitting the service stream further comprises splitting the service stream into n service substreams based on a policy configuration, each service substream corresponding to a quality of service requirement, where n is a positive integer; and
    the step of establishing the network slices further comprises establishing the network slices respectively corresponding to each service substream of the plurality of service substreams based on the quality of service requirement of each service substream of the plurality of service substreams.

3. The method according to claim 2, wherein:
    the service stream is the asymmetric service stream; and
    the step of splitting the service stream into n service substreams further comprises splitting service data in the asymmetric service stream into n service substreams based on the transmission direction, wherein the transmission direction includes at least one of an uplink direction and a downlink direction.

4. The method according to claim 2, wherein:
    the service stream is the hybrid service stream, and
    the step of splitting the service stream into n service substreams further comprises splitting service data in the hybrid service stream into n service substreams based on the service type, where the service data of the hybrid service stream includes the at least two different service types, including the at least two of the control data, the map data, the audio data, the video data, and the security warning data.

5. The method according to claim 2, wherein the step of establishing the network slices further comprises:
    calling an application programming interface provided by a lower layer by using an application program; and
    establishing the network slices respectively corresponding to each service substream of the plurality of service substreams according to the quality of service requirement of the service substream by using the application programming interface, the quality of service requirement being passed to the lower layer by the application program in the calling process.

6. The method according to claim 1, wherein at least one service substream in the plurality of service substreams is transmitted via Enhanced Mobile Broadband (eMBB).

7. The method according to claim 1, wherein the network slices are connected to the same or different user plane functions (UPF).

8. A service data transmission method performed by a terminal, the method comprising:
- splitting a service stream into a plurality of service substreams, wherein the splitting step includes splitting the service stream based on a service type when the service stream is a hybrid service stream with at least two different service types of service data including at least two of control data, map data, audio data, video data, and security warning data, and splitting the service stream based on a transmission direction when the service stream is an asymmetric service stream including both uplink service data and downlink service data;
- establishing connections respectively corresponding to the plurality of service substreams, the connections being connections that are irrelevant to a network slice or quality of service streams in the network slice; and
- transmitting service data of each service substream of the plurality of service substreams by using the established connections, at least one service substream in the plurality of service substreams being transmitted by using a packet duplication mechanism.

9. A service data transmission method that is performed by a network-side network element, the method comprising:
- transmitting a policy configuration of a service stream to a terminal, the policy configuration being used by the terminal to split the service stream into a plurality of service substreams, wherein the policy configuration includes splitting the service stream based on a service type when the service stream is a hybrid service stream with at least two different service types of service data including at least two of control data, map data, audio data, video data, and security warning data, and splitting the service stream based on a transmission direction when the service stream is an asymmetric service stream including both uplink service data and downlink service data;
- establishing network slices respectively corresponding to the plurality of service substreams; and
- receiving the plurality of service substreams transmitted by the terminal by using the established network slices respectively corresponding to each service substream of the plurality of service substreams, where at least one service substream in the plurality of service substreams is transmitted by using a packet duplication mechanism.

10. The method according to claim 9, wherein:
- the service stream includes the asymmetric service stream,
- the policy configuration includes splitting service data in the asymmetric service stream into n service substreams based on the transmission direction, where n is a positive integer, and
- the transmission direction includes at least one of an uplink direction and a downlink direction.

11. The method according to claim 9, wherein:
- the service stream includes the hybrid service stream,
- the policy configuration includes splitting service data in the hybrid service stream into n service substreams based on the service type, and
- the service data of the hybrid service stream includes the at least two different service types, including the at least two of the control data, the map data, the audio data, the video data, and the security warning data.

12. The method according to claim 9, wherein at least one service substream in the plurality of service substreams is transmitted via Enhanced Mobile Broadband (eMBB).

13. The method according to claim 9, wherein the network slices are connected to a same or different user plane functions (UPF).

* * * * *